United States Patent [19]

Henderson

[11] 4,379,011

[45] Apr. 5, 1983

[54] METHOD OF MAKING ARCHED V-BELTS

[75] Inventor: Dewey D. Henderson, Springfield, Mo.

[73] Assignee: Dayco Corporation, Dayton, Ohio

[21] Appl. No.: 263,965

[22] Filed: Sep. 8, 1981

[51] Int. Cl.³ .............................................. B28H 7/22
[52] U.S. Cl. .................................. 156/140; 156/142; 264/314; 425/28 B
[58] Field of Search ............... 156/141, 142, 140, 438, 156/137; 264/314, 325; 425/28 B, 34 B

[56] References Cited

U.S. PATENT DOCUMENTS

| | | | |
|---|---|---|---|
| 2,671,244 | 3/1954 | Freedlander | 425/28 B |
| 2,883,701 | 4/1959 | Sauer | 425/34 B |
| 3,615,988 | 10/1971 | Richmond et al. | 156/141 |
| 3,964,846 | 6/1976 | Bliss | 425/28 B |
| 4,106,966 | 8/1978 | Brooks | 156/141 |

*Primary Examiner*—Michael W. Ball

*Attorney, Agent, or Firm*—Joseph V. Tassone

[57] ABSTRACT

A method of making arched polymeric V-belts is provided which utilizes a cylindrical polymeric forming member which has radially inwardly facing annular concave polymeric forming surfaces and wherein an uncured belt sleeve is placed with its normal outside surface adjacent the polymeric forming surfaces and compressed thereagainst during curing thereof and the compressing action is achieved by engaging the inside surface of the belt sleeve and urging the belt sleeve radially outwardly against the polymeric forming member and its forming surfaces while transmitting the same pressure against each unit area of such inside surface to thereby define annular arched belt portions in the sleeve which are then cut from such sleeve to define arched belts each having a convex surface and an opposite concave surface which are defined with great precision and with all arched belts cut from the cured belt sleeve being substantially identical.

10 Claims, 7 Drawing Figures

METHOD OF MAKING ARCHED V-BELTS

BACKGROUND OF THE INVENTION

1. Field of the Invention

This invention relates to a method of making arched V-belts consisting primarily of polymeric material.

2. Prior Art Statement

It is known in the art to provide a method of making a plurality of polymeric arched V-belts comprising the steps of, defining an uncured belt sleeve having inside and outside surfaces, providing a metal forming member having a plurality of substantially identical axially aligned and annular metal forming surfaces of concave cross-sectional configuration, placing the uncured belt sleeve with its inside surface adjacent the metal forming surfaces, compressing the belt sleeve against the metal forming surfaces to thereby form annular arched portions in the sleeve with each of the arched portions corresponding roughly in configuration to a forming surface, curing the belt sleeve during the compressing step, cutting the cured belt sleeve to define a plurality of arched belts corresponding in number to the plurality of annular forming surfaces with each of the arched belts also corresponding roughly in configuration to a forming surface, and inverting each arched belt thus defined and as disclosed in U.S. Pat. No. 3,615,988.

However, although the method of U.S. Pat. No. 3,615,988 enables the production of arched polymeric V-belts which have been commercially successful, it has certain deficiencies, some of which will now be described. In particular, in using the method of this patent it is difficult to separate each cured belt sleeve from its concave metal forming surfaces and in some instances the cured sleeve has been damaged during removal resulting in unnecessary scrapping of portions of the cured sleeve and added belt costs. Also, with such method it is not commercially practical to make arched belts which use a load-carrying cord, in their associated belt sleeve, made of a material which has poor compressive strength, e.g., glass and aromatic polyamides, for example, inasmuch as the method requires such belt sleeve to be made in an inverted manner and during curing the load-carrying cord is subjected to compressive loads. Finally, the method of this patent teaches the use of a cylindrical rubber member, which has a comparatively thick wall, for the purpose of applying forming forces during curing and the thick wall thereof makes it difficult to define arched portions in the belt sleeve being cured in a precise manner.

It has been proposed in U.S. Pat. No. 4,106,966 to provide a method of making endless power transmission belts each having a toothed outside surface by building a belt sleeve on a drum, disposing a polymeric curing jacket having a toothed inside surface around the sleeve with the teeth of the jacket against the sleeve, curing the sleeve while applying pressure radially inwardly against the jacket so that the jacket defines a toothed outside surface on the sleeve during curing, and cutting the cured sleeve to define a plurality of belts each having a toothed outside surface.

It has also been proposed in U.S. Pat. No. 2,883,701 to provide a method of making a plurality of individual V-belts in a correct or right-side-out manner by applying a radially outwardly direct fluid pressure against uncured individual belt bodies through a comparatively thick walled flexible sleeve while subjecting the uncured belt bodies and supporting components to a curing environment.

Finally, it has been proposed in U.S. Pat. No. 3,964,846 to apply, during curing, a radially outwardly directed fluid pressure against an ordinary belt sleeve which may utilize a reinforcing member made of glass material and the radially outwardly directed pressure prevents compressive loads from being exerted against the glass material. The method of this latter patent also provides for the application of a lesser radially inwardly directed pressure against the sleeve during curing.

It is an object of this invention to provide an improved method of making a plurality of arched polymeric V-belts.

Other aspects, embodiments, objects, and advantages of this invention will become apparent from the following specification, claims, and drawings.

SUMMARY

In accordance with the present invention there is provided an improved method of making a plurality of arched polymeric V-belts which overcomes the above-mentioned deficiencies. The method of this invention comprises the steps of defining an uncured belt sleeve having an inside and an outside surface, providing a forming member having a plurality of substantially identical axially aligned annular forming surfaces of concave cross-sectional configuration, placing the uncured belt sleeve with one of its surfaces adjacent the forming surfaces, compressing the belt sleeve against the forming member and its forming surfaces to thereby form annular arched portions in the sleeve with each of the arched portions corresponding roughly in configuration to a forming surface, curing the belt sleeve during the compressing step, and cutting the cured belt sleeve to define a plurality of arched belts corresponding in number to the plurality of annular forming surfaces with each of the arched belts also corresponding roughly in configuration to a forming surface.

In accordance with one embodiment of this invention the step of providing a forming member comprises providing the forming member as a polymeric member which has the forming surfaces thereof defined as radially inwardly facing polymeric surfaces, the placing step comprises placing the belt sleeve with the one surface being its normal outside surface adjacent the polymeric forming surfaces, the compressing step comprises compressing the belt sleeve by engaging the inside surface thereof and transmitting the same pressure radially outwardly against each unit of area of its inside surface and thereby define each belt portion of the sleeve that will provide one arched belt having the convex surface and opposite concave surface which are defined with great precision and with all arched belts cut from the cured belt sleeve being substantially identical in configuration.

The compressing step comprises the step of compressing the belt sleeve with a single self-contained inflatable polymeric bladder comprised of a pair of annular end walls having inner and outer edges, a cylindrical inner wall extending between the inner edges, and a cylindrical outer wall extending between the outer edges, the walls being highly flexible and the cylindrical outer wall engaging the inside surface throughout its entire surface area and transmitting the same pressure against each unit area thereof upon inflating of the bladder. The curing step comprises the step or providing a steam curing apparatus. The apparatus comprises a housing, a top access opening, and confining walls within the housing, the confining walls comprising a bottom plate structure fixed to the housing, a first tubular structure fixed to the bottom structure, a second tubular structure fixed to the bottom structure concentrically outwardly of the first structure and defining an annular volume therebetween, and a top plate structure adapted to be detachably fastened to the first and second tubular structures. The method further comprises the steps of disposing the polymeric forming member through the access opening with an outside surface thereof against the second tubular structure and the polymeric forming surfaces facing radially inwardly toward the volume. The placing step comprises the step of moving the belt sleeve vertically downwardly through the top access opening within the volume. The compressing step comprises the step of inserting the bladder through the top access opening within the annular volume between the belt sleeve and the first tubular structure and confining the end walls between the top and bottom plate structures and the cylindrical inner wall employing the first tubular structure while allowing the cylindrical outer wall to move freely against the entire inside surface area of the belt sleeve upon inflating of the bladder. The curing step comprises the step of sealing a lid over the access opening and introducing steam within the housing to provide curing of the belt sleeve. The cooling step comprises the steps of removing the polymeric forming member and the cured belt sleeve as a unit from between the first and second tubular structures and cooling the polymeric forming member and the cured belt sleeve together as a unit. The method includes the step of separating the cured belt sleeve from the polymeric forming member after the same have been cooled, the separating step being achieved with comparative ease due to the small tendency of the belt sleeve to adhere to the polymeric forming member and its forming surface.

BRIEF DESCRIPTION OF THE DRAWINGS

The accompanying drawings show present preferred embodiments of this invention, in which.

DETAILED DESCRIPTION

Figure 1:
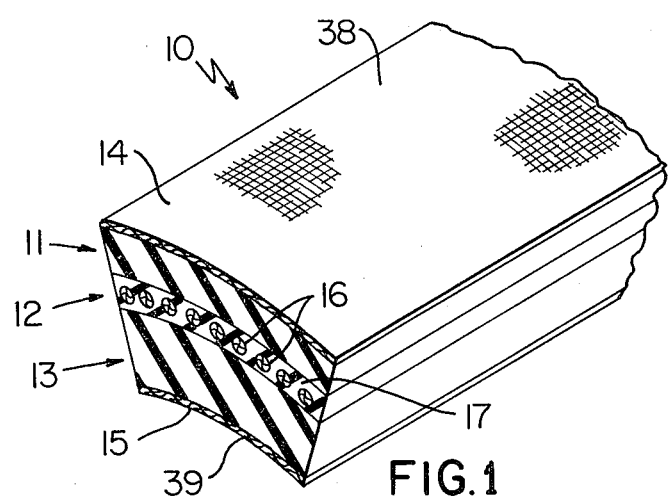
FIG. 1 is a fragmentary isometric view illustrating one exemplary embodiment of an arched V-belt made utilizing the method of this invention.

Reference is now made to FIG. 1 of the drawings which illustrates one exemplary embodiment of an arched V-belt made utilizing the method of this invention and such belt is designated generally by the reference numeral 10. The belt 10 is made primarily of polymeric material, and thus will be referred to as a polymeric V-belt; and, such belt is particularly adapted to be used in transmitting power with minimum tendency for dishing even under conditions where comparatively high loads are being transmitted by the belt 10, and this minimum tendency for dishing is a typical performance characteristic of an arched power transmission belt.

The belt 10 has the usual tension section 11, load-carrying section 12, and compression section 13. The tension section 11 and compression section 13 of the exemplary belt 10 are each shown by cross-hatching as being comprised of polymeric material in the form of rubber; and, the tension section 11 has a fabric cover 14 defining the outside surface of the belt while the compression section 13 has a fabric cover 15 defining the inside surface of such belt. The load-carrying section 12 is comprised of a helically wound load-carrying cord 16 and preferably such cord is made of a comparatively inextensible high-strength material such as glass fibers aromatic polyamide, or the like. The helically wound cord 16 is embedded substantially centrally in the usual gum cushion 17, which may be made of a suitable rubber, and the cushion 17 is disposed in sandwiched relation between the tension section 11 and compression section 13.

Figure 3:
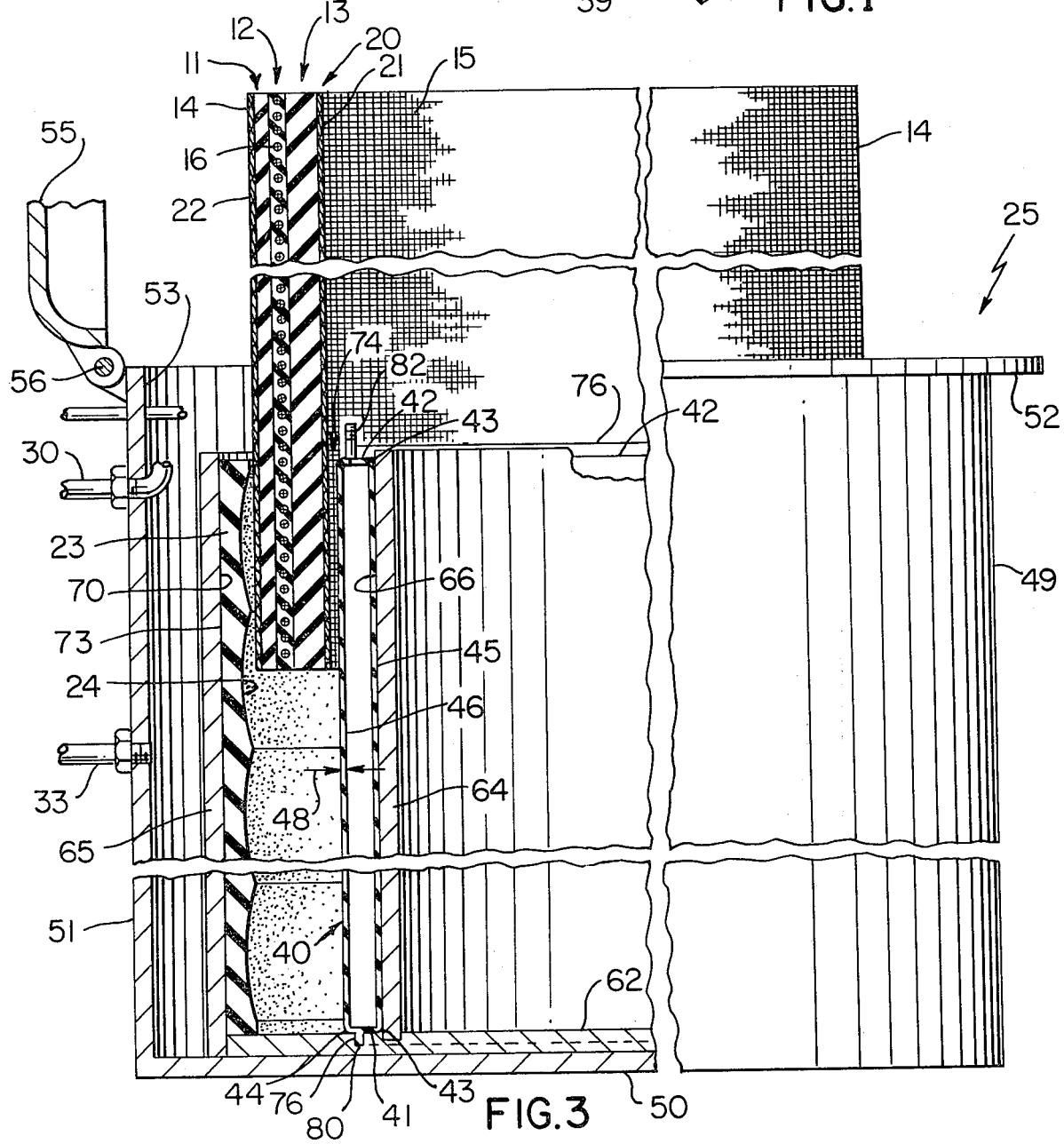
FIG. 3 is a view with parts in cross section, parts in elevation, and parts broken away illustrating components of the apparatus of FIG. 2 and method steps employed in the method of making the belt of FIG. 1.

The method of this invention comprises the step of defining an uncured belt sleeve, which is designated generally by the reference numeral 20 in FIG. 3. The uncured belt sleeve is comprised of a compression section defining portion 13 with its fabric layer 15, load-carrying section defining portion 12 with its load-carrying cord 16, and tension section defining portion 11 with its fabric layer 14; and, it will be noted that, for simplicity, such portions and components have the same reference numerals as corresponding components of the completed belt. The belt sleeve 20 has an inside surface 21 and an outside surface 22 and such inside and outside surfaces 21 and 22 are defined by exposed surface portions of the fabric layers 15 and 14 respectively.

The method of this invention also comprises the step of providing a forming member 23 which has a plurality of substantially identical axially aligned annular forming surfaces 24 of concave cross-sectional configuration with a representative few of such surfaces being illustrated in FIG. 3. The forming surfaces 24 may be defined by molding action, may be cut or ground into a sleeve blank, or may be made by any other suitable means. The forming member 23 is adapted to be disposed in a suitable curing apparatus of basically conventional construction and such apparatus is designated generally by the reference numeral 25 and will be described in more detail subsequently. The uncured belt sleeve 20 is then placed with one of its surfaces adjacent the forming surfaces 24; and, in this example of the invention the belt sleeve 20 is provided with its outside surface 22 adjacent the forming surfaces 24.

Figure 4:
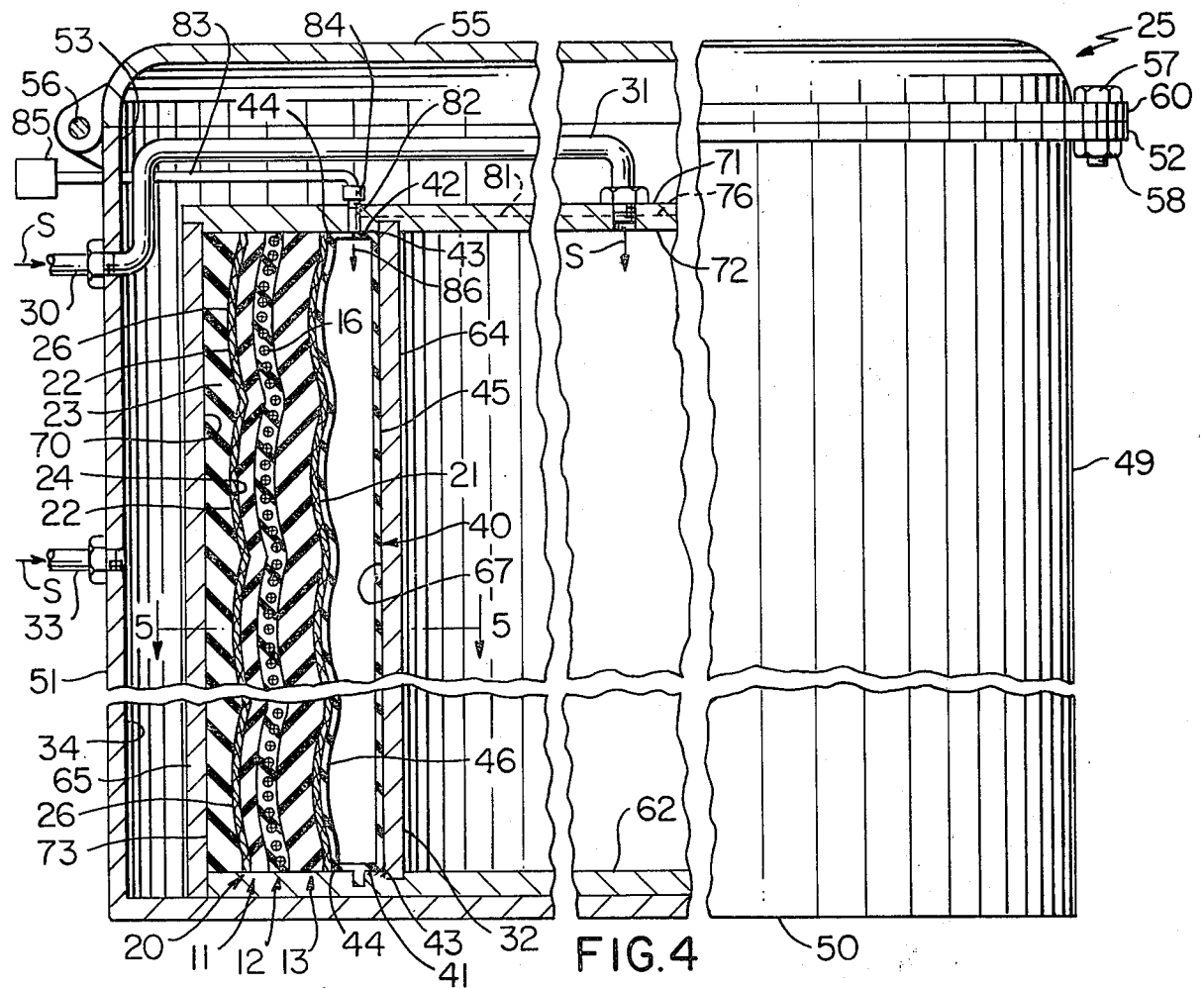
FIG. 4 is a view with parts in cross section, parts in elevation, and parts broken away taken essentially on the line 4—4 of FIG. 2 illustrating the forming and curing of an uncured belt sleeve from which a plurality of belts, which are substantially identical to the belt of FIG. 1, are cut.

The belt sleeve 20 is compressed against the forming member 23 and its forming surfaces 24 to thereby form annular arched portions in the sleeve 20 and such annular arched portions are illustrated in FIG. 4 and representative ones of such arched portions are designated generally by the reference numeral 26. Each of the arched portions 26 corresponds in configuration to a forming surface 24; however, in accordance with the teaching of this invention, each of the arched portions 26 corresponds precisely in configuration to a forming surface 24, as will be described subsequently.

The belt sleeve 20 is cured during the compressing step and the curing is achieved utilizing the curing apparatus 25 (FIG. 4) and employing techniques which are known in the art. In particular, the curing action is provided by introducing steam S under pressure though a conduit 30 into the curing apparatus 25 and such steam is conveyed by conduit 31 into a cylindrical chamber 32 in the center of the apparatus 25. Steam S under pressure is also introduced through a conduit 33 so that it flows into an annular chamber 34 in the apparatus 25; and, the annular chamber 34 is disposed concentrically outwardly of the belt sleeve 20. The cooperating action of the steam S in the central chamber 32 and the steam in the annular outer chamber 34 serves to cure the belt sleeve 20 as is known in the art. Suitable passage means, not shown, is provided for removing steam and any condensation from within chambers 32 and 34.

The sleeve 20 and its forming member 23 are removed from within the apparatus 25 after curing and suitably cooled, preferably by immersing same in a bath of cold tap water. The cured and cooled sleeve 20 is separated from the forming member 23 and separation is achieved with comparative ease due to the small tendency of the belt sleeve 20 to adhere to the polymeric forming member and in particular to the forming surfaces 24 of such member 23. Separation may be achieved by simply collapsing the cured belt sleeve 20 radially inwardly and away from the surrounding forming member 23. To aid in separating the sleeve 20 from the member 23 a suitable release agent may be interposed therebetween before placing the sleeve 20 in the apparatus 25 for curing.

Figures 5, 6:
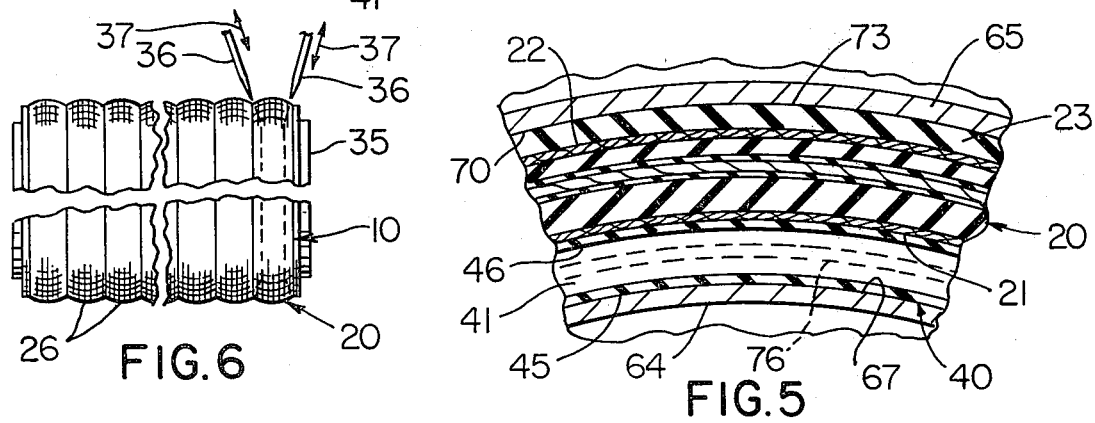
FIG. 5 is a cross-sectional view taken essentially on the line 5—5 of FIG. 4.
FIG. 6 is a fragmentary view, with certain parts shown schematically, illustrating the step of cutting the cured belt sleeve to define a plurality of arched belts which are substantially identical to the belt of FIG. 1.

The cured belt sleeve is then disposed on a suitable cutting mandrel 35 as illustrated in FIG. 6 and cut employing mechanical cutting means preferably consisting of a pair of cooperating cutting knives 36. The cutting action may be achieved by rotating the sleeve 20 and its mandrel 35 relative to the knives 36 while holding such knives stationary. In the case of rotatable knives both the knives 36 and sleeve 20- mandrel 35 combination may be rotated as is known in the art. Each knife 36 is provided with an associated actuating means 37, shown schematically by a double arrow, for bringing same into and out of engagement with cured sleeve 20. The cutting action results in a plurality of arched belts 10 which correspond in number to the plurality of annular forming surfaces 24 of the forming member 23. The belts 10 are of precise configuration and as will now be described.

As will be readily apparent from FIGS. 3 and 4 of the drawings the polymeric forming member 23 has its forming surfaces 24 defined as radially inwardly facing polymeric surfaces, i.e., such forming surfaces 24 face radially inwardly toward the central longitudinal axis of the belt sleeve 20; and, in this example such axis coincides with the central longitudinal axis of the curing apparatus 25. The uncured belt sleeve 20 is placed in position, as illustrated in FIG. 3, with its normal outside surface 22 adjacent the polymeric forming surfaces 24. This reference to normal outside surface refers to the fact that the belt sleeve is constructed so that its outside surface 22 is the right or correct side to be disposed outwardly in the sleeve whereby upon curing the sleeve with the annular arched portions 26 therein and cutting same from the belt body the resulting belts 10 are correct side or right side out. This is in contrast to the technique disclosed in the previously mentioned U.S. Pat. No. 3,615,988 in which the curing of the belt sleeve is achieved with such belt sleeve inverted or inside out.

By forming the arched portions 26 right side out, it is possible to utilize a comparatively inextensible material of high tensile strength and low compressive strength, such as, glass fibers, an aromatic polyamide, or the like, to define the load-carrying cord 16 of each completed belt 10. Further, during arch forming and curing such load-carrying cord 16 is slightly tensioned and is then held in position by the cured polymeric material surrounding same at the completion of curing whereby the resulting arched belt provides optimum performance.

During curing of the uncured belt sleeve 20 in its normal or right side out arrangement with its normal outside surface 22 adjacent the polymeric forming surfaces 24 the sleeve is compressed by engaging the inside surface 21 thereof and transmitting the same pressure radially outwardly against each unit area of the inside surface 21. This transmittal of the same force against each unit area of the inside surface defines each belt portion and arched belt having a convex surface 38 and opposite concave surface 39 which are defined with great precision whereby all arched belts cut from the cured belt sleeve 20 are substantially identical in configuration.

The key to the provision of belts 10 of substantially identical configuration is in the compressing step; and, as will be readily apparent from FIGS. 3 and 4 of the drawing the compressing is achieved with a self-contained device in the form of an inflatable polymeric bladder which is designated generally by the reference numeral 40. The bladder 40 is comprised of a pair of annular end walls 41 and 42 having inner edges 43 and outer edges 44, a cylindrical inner wall 45 extending between the inner edges 43, and a cylindrical outer wall 46 extending between the outer edges 44. The walls 41, 42, 45 and 46 are flexible walls and the outer wall 46 is highly flexible and engages the inside surface 21 of the uncured sleeve 20 throughout its entire surface area. The outer wall 46 has a thickness 48 which is a fractional part of the thickness of the sleeve 20; and, due to the high flexibility thereof, the wall 46 transmits the same pressure against each unit area of the inside surface 21 upon inflating the bladder 40, and as will be described subsequently.

The curing of the uncured belt sleeve 20 is achieved utilizing the curing apparatus 25, as previously mentioned. As seen in FIG. 3, the apparatus 25 comprises an open cup-like housing 49 which is comprised of a bottom wall 50 and a right circular cylindrical tubular side wall 51 which adjoins the bottom wall 50. The side wall 51 has a top annular flange 52 fixed thereto and has a top access opening 53.

Figure 2:
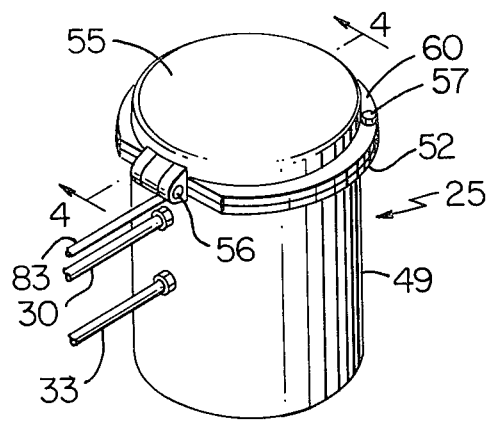
FIG. 2 is an isometric view illustrating a steam curing apparatus which may be used in carrying out the method of this invention.

The apparatus 25 also has a hinged top member or lid 55 which is hingedly fastened to the side wall 51 by a hinge pin 56. The hinge pin 56 is disposed through cooperating lugs fixed to the lid 55 and side wall 51. The hinged top 55 is adapted to be opened as illustrated in FIG. 3 to provide unobstructed access to the access opening 53; and, once all components comprising the curing apparatus 25 are disposed within the housing 49 and the uncured sleeve 20 and its forming member 23 are disposed in position, the lid 55 is closed as illustrated in FIGS. 2 and 4. The lid 55 is fastened in position by a plurality of fastening bolts 57 and cooperating nuts 58, as shown in FIG. 4 and as is known in the art. Each bolt 57 extends through cooperating aligned openings in the flange 52 and a similar flange 60 in the lid 55 and suitable seal means (not shown) may be provided between the flanges 52 and 60 to provide a fluid-tight seal between the wall 51 and lid 55 enabling the curing of the uncured belt sleeve 20 in the apparatus 25 as is known in the art.

The curing apparatus has confining walls within the housing structure thereof (FIG. 3) and such confining walls comprise a bottom plate structure 62 detachably fixed to the housing 49 and in particular to the bottom wall 50 of housing 49, a first tubular structure 64 detachably fixed to the bottom structure 62, and a second tubular structure 65 also detachably fixed to the plate structure 62 concentrically outwardly of the first tubular structure 64. The structures 64 and 65 define an annular cylindrical volume 66 therebetween and, in particular, between an outside right circular cylindrical surface 67 of the structure 64 and an inside right circular cylindrical surface 70 of the structure 65. As seen in FIG. 4, the curing apparatus 25 also has a top plate structure 71 which is adapted to be detachably fastened to the first and second tubular structures 64 and 65 respectively; and, a bottom surface portion 72 thereof defines the top surface of the central steam chamber 32.

In practicing the method of this invention, the polymeric forming member 23 is disposed through the access opening 53 with an outside surface 73 thereof against the tubular structure 65 and in particular against the surface 70 thereof; and, with the polymeric forming surfaces 24 facing radially inwardly toward the annular volume 66 and hence the central longitudinal (vertical) axis of the apparatus 25. During the step of placing the uncured belt sleeve 20 in position, it is moved vertically downwardly through the top access opening 53 within the cylindrical annular volume 66.

The previously mentioned compressing step comprises compressing the uncured belt sleeve 20 during curing utilizing the inflatable bladder 40 and such compressing step comprises inserting the bladder 40 through the access opening 53 within the cylindrical volume 66 and between the uncured belt sleeve 20 and the tubular structure 64 and in particular the outside surface 67 of such tubular structure 64. This insertion may be achieved with optimum simplicity due to the comparatively large radial clearance 74 illustrated in FIG. 3, which provides substantial clearance between the inside surface 21 of the uncured belt sleeve 20 and the outside surface of the bladder 40.

Once the bladder is inserted in the apparatus 25 the end walls 41 and 42 of the bladder 40 are confined between the bottom and top plate structures 62 and 71 respectively; and, the cylindrical inner wall 45 of the bladder 40 is confined by the surface 67 of the tubular structure 64. However, the cylindrical outer wall 46 of the bladder is free to move against the entire inside surface 21 of the uncured belt sleeve 20 upon inflating the bladder 40.

As seen in FIG. 3 of the drawings, the clearances involved are such that the uncured belt sleeve 20 may be inserted in position within the curing apparatus 25 in a free and unobstructed manner without damage thereto. The inflatable bladder 40 may be similarly inserted in position in an unobstructed manner and it will be appreciated that the bladder may be inserted in position either before or after the uncured sleeve 20 is inserted in position. In this example of the invention the bladder is inserted in position first followed by insertion of the uncured belt sleeve 20.

The bladder 40 may also be provided with a top and a bottom annular projection each designated by the reference numeral 76 to aid in holding such bladder in position. The bottom annular projection 76 extends from its bottom end wall 41 while a substantially identical top annular projection 76 extends from its top end wall 42. The bottom projection 76 is supported in an annular slot 80 in the plate structure 62 while the top projection is supported in an annular slot 81 in the top plate structure 71.

The bladder 40 also has an inflating valve 82 extending from its top end wall 42 and through a slot in the top projection 76. The valve 82 has a conduit 83 detachably connected to its top portion by a fitting 84. The conduit 83 extends in sealed relation through the side wall 51 of the housing 49 of the apparatus 25 and is operatively connected to a source 85 of air 86 under pressure.

Figure 7:
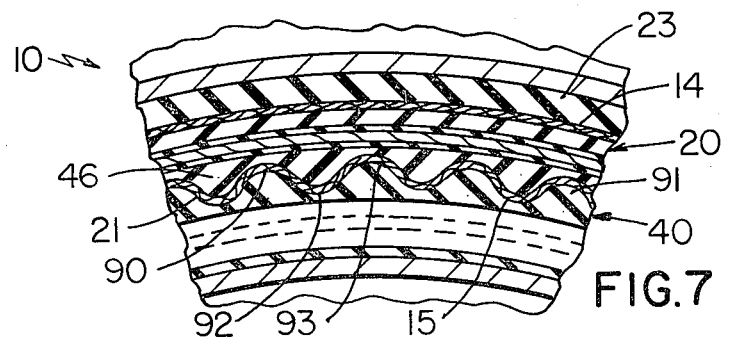
FIG. 7 is a view similar to FIG. 5 illustrating a modification of the arched belt of this invention and associated components employed in making same using the method of this invention.

A typical arched belt 10 made in accordance with the method of this invention is illustrated in FIG. 1 of the drawing and a typical cross section of a cured sleeve 20 from which the belt 10 is made is illustrated in FIG. 5. However, it will be appreciated that the belt 10 may be provided with a toothed inside surface, if desired. In order to provide such a toothed inside surface the cylindrical inside surface 21 of the sleeve may be suitably operatively associated with semicylindrical means, or the like, during the compressing step to define a plurality of spaced axial grooves 90 in the inside surface of the belt sleeve and as illustrated in FIG. 7. The axial grooves 90 may be provided using any technique known in the art, such as a separate member having semicylindrical rib means with such separate member being inserted between the uncured belt sleeve 20 and the cylindrical outer wall 46 of the bladder 40. In this example substantially semicylindrical rib means 91 are shown provided as an integral part of the outer cylindrical wall 46.

However, regardless of how defined the resulting arched belt of FIG. 7, also designated by the reference numeral 10, once cut from the cured sleeve defining same has a precisely defined convex outside surface and a precisely defined concave inside surface. The concave inside surface is defined by a plurality of alternating projections 92 and grooves 93 which define the arched belt of FIG. 7 as an internally toothed or cog type belt.

In this disclosure, certain components of the belt 10 have been illustrated by cross-hatching as being made of rubber; however, it is to be understood that any suitable polymeric material employed in the art of making power transmission belts may be used instead of the rubber illustrated.

It will also be appreciated that the fabric layers 14 and 15 are preferably rubber-impregnated layers wherein one or both surfaces may be impregnated with rubber utilizing any suitable technique known in the art. Further, the fabric layers may be made of woven fabric, non-woven fabric, knitted fabric, or any other fabric capable of being used in the art of making endless power transmission belts.

While present examples of the method of this invention have been illustrated and described, it will be recognized that this invention may be otherwise practiced within the scope of the following claims.

What is claimed is:

1. In a method of making a plurality of arched, polymeric V-belts comprising the steps of, defining an uncured belt sleeve having an inside and an outside surface, providing a forming member having a plurality of substantially identical axially aligned annular forming surfaces of concave cross-sectional configuration, placing said uncured belt sleeve with one of its surfaces adjacent said forming surfaces, compressing said belt sleeve against said forming member and its forming surfaces to thereby form annular arched portions in said sleeve, each of said arched portions corresponding roughly in configuration to a forming surface, curing said belt sleeve during said compressing step, and cutting the cured belt sleeve to define a plurality of arched belts corresponding in number to said plurality of annular forming surfaces with each of said arched belts also corresponding roughly in configuration to a forming surface, the improvement in said method in which, said step of providing a forming member comprises providing said forming member as a polymeric member which has said forming surfaces defined as radially inwardly facing polymeric surfaces, said placing step comprises placing said belt sleeve with said one surface being its normal outside surface adjacent said polymeric forming surfaces, said compressing step comprising the step of compressing said belt sleeve by engaging said inside surface thereof and transmitting the same pressure radially outwardly against each unit of area of said inside surface and thereby define each belt portion of said sleeve that will provide one arched belt with a convex surface and an opposite concave surface which are defined with great precision and with all arched belts cut from the cured belt sleeve being substantially identical in configuration, said compressing step comprising the step of compressing said belt sleeve with a single self-contained inflatable polymeric bladder comprised of a pair of annular end walls having inner and outer edges, a cylindrical inner wall extending between said inner edges, and a cylindrical outer wall extending between said outer edges, said walls being highly flexible and said cylindrical outer wall engages said inside surface throughout its entire surface area and transmits said same pressure against each unit area thereof upon inflating said bladder, said curing step comprising the step of providing a steam curing apparatus, said apparatus comprising a housing, a top access opening, and confining walls within said housing, said confining walls comprising, a bottom plate structure fixed to said housing, a first tubular structure fixed to said bottom structure, a second tubular structure fixed to said bottom structure concentrically outwardly of said first structure and defining an annular volume therebetween, and a top plate structure adapted to be detachably fastened to said first and second tubular structures; and said method comprising the further steps of disposing said polymeric forming member through said access opening with an outside surface thereof against said second tubular structure and with said polymeric forming surfaces facing radially inwardly toward said volume; said placing step comprising the step of moving said belt sleeve vertically downwardly through said top access opening within said volume; said compressing step comprising the step of inserting said bladder through said top access opening within said annular volume between said belt sleeve and first tubular structure and confining said end walls between said top and bottom plate structures and said cylindrical inner wall employing said first tubular structure while allowing said cylindrical outer wall to move freely against said entire inside surface area of said belt sleeve upon inflating of said bladder; said curing step comprising the step of sealing a lid over said access opening and introducing steam within said housing to provide curing of said belt sleeve; said cooling step comprising the steps of removing said polymeric forming member and said cured belt sleeve as a unit from between said first and second tubular structures and cooling said polymeric forming member and said cured belt sleeve together as a unit; and separating said cured belt sleeve from said polymeric forming member after the same have been cooled, said separating step being achieved with comparative ease due to the small tendency of said belt sleeve to adhere to said polymeric forming member and its forming surface.

2. A method as set forth in claim 1 in which said polymeric bladder is made of rubber and said compressing step comprises inflating said bladder using air under pressure.

3. A method as set forth in claim 2 in which said cutting step comprises disposing said sleeve on a cutting mandrel and cutting said sleeve employing mechanical cutting means.

4. A method as set forth in claim 3 in which said cutting step comprises rotating said mandrel and sleeve and cutting said sleeve by urging said mechanical means consisting of a knife means against said sleeve.

5. A method as set forth in claim 1 in which said cooling step comprises immersing said cured belt sleeve and forming member in cold tap water.

6. A method as set forth in claim 1 in which said separating step comprises the preparation step of disposing a release agent between the uncured belt sleeve and polymeric forming member prior to said suring step.

7. A method as set forth in claim 1 in which said compressing step comprises using air under pressure to inflate said bladder.

8. A method as set forth in claim 1 in which said cutting step comprises disposing said sleeve on a cutting mandrel and cutting said sleeve employeing mechanical cutting means.

9. A method as set forth in claim 8 in which said cutting step comprises rotating said mandrel and sleeve and urging rotating knife means against said sleeve during rotation thereof.

10. A method as set forth in claim 1 in which said step of defining an uncured belt sleeve comprises defining said belt sleeve having a load-carrying cord which defines a corresponding load-carrying cord in said arched belts and wherein said cord is made of a material having poor compressive strength and high tensile strength, and said compressing step places said cord in tension resulting in said arched belts having optimum performance characteristics.

* * * * *